(12) United States Patent
Wium

(10) Patent No.: US 7,181,980 B2
(45) Date of Patent: Feb. 27, 2007

(54) SUBSEA MULTIPHASE FLOW METER DETECTOR RETRIEVABLE ELECTRONICS

(75) Inventor: Rolf Wium, Drammen (NO)

(73) Assignee: Roxar Flow Measurement AS, Bergen (NO)

( * ) Notice: Subject to any disclaimer, the term of this patent is extended or adjusted under 35 U.S.C. 154(b) by 0 days.

(21) Appl. No.: 11/112,679

(22) Filed: Apr. 22, 2005

(65) Prior Publication Data

US 2005/0241410 A1 Nov. 3, 2005

Related U.S. Application Data

(60) Provisional application No. 60/566,701, filed on Apr. 30, 2004.

(51) Int. Cl.
*G01F 1/74* (2006.01)

(52) U.S. Cl. .................................................. 73/861.04

(58) Field of Classification Search .................. 175/50; 73/861.04, 152.52, 152.01, 156.01
See application file for complete search history.

(56) References Cited

U.S. PATENT DOCUMENTS

| 4,080,025 A | 3/1978 | Garnier et al. |
| 4,096,745 A * | 6/1978 | Rivkin et al. ............ 73/861.04 |
| 4,625,805 A | 12/1986 | Ladecky |
| 5,033,288 A | 7/1991 | Castel |
| 5,127,272 A | 7/1992 | Dean et al. |
| 5,135,684 A | 8/1992 | Mohn et al. |
| 6,026,915 A * | 2/2000 | Smith et al. .................. 175/50 |
| 6,640,901 B1 | 11/2003 | Appleford et al. |
| 2003/0042025 A1 | 3/2003 | Fenton et al. |

* cited by examiner

*Primary Examiner*—Jewel Thompson
(74) *Attorney, Agent, or Firm*—Seyfarth Shaw LLP

(57) ABSTRACT

An apparatus and a method for its use allow selective installation and removal of a canister such as one containing interface electronics to a mating connector on a housing, such as one containing a subsea multiphase flow meter sensor. The separately retrievable canister may contain multiphase flow meter detector electronics and is sealed, waterproof, and preferably light-weight. Installation and retrieval may be via use of an ROV and an alignment guide which acts as a guide to aid in correct positioning of the canister. The canister may be cooled by surrounding sea water and/or by insulation.

19 Claims, 4 Drawing Sheets

SUBSEA MULTIPHASE FLOW METER DETECTOR RETRIEVABLE ELECTRONICS

RELATION TO OTHER APPLICATIONS

This application claims priority through U.S. Provisional Patent Application No. 60/566,701, filed on Apr. 30, 2004.

FIELD OF THE INVENTION

This invention relates to a subsea device and more particularly to a retrievable subsea multiphase fluid flow meter wherein a method of and apparatus for engaging or disengaging a water-tight canister containing the flow meter electronics is utilized.

BACKGROUND OF THE INVENTION

Multiphase flow meters in the oil and gas industry are commonly used for topside (non-subsea) applications. Subsea non-retrievable multiphase flow meters are also common which have little or no distinguishing features from topside multiphase flow meters other than a water-proof design and/or remotely deliverable electrical and hydraulic power connections.

Existing subsea retrievable multiphase flow meters include complex and expensive stationary inlet and outlet sections in which the multiphase flow meter detector electronics are non-detachable.

Existing subsea retrievable multiphase flow meters have the disadvantage of non-detachably housing the flow meter detector electronics such that removal of the entire meter is required to service or repair it, causing significant downtime and expense.

Typical multiphase subsea oil and gas flows at high temperatures which detrimentally effects the multiphase flow detector electronics by reducing its mean time before failure. Existing subsea retrievable multiphase flow meters have the disadvantage of not providing an inexpensive cooler for stabilizing the multiphase flow detector electronics and thereby improving mean time before failure.

SUMMARY OF THE INVENTION

The present inventions relate to a apparatus and a method for allowing a subsea multiphase flow meter sensor housing directly attached to, but detachable from, a separately retrievable canister containing multiphase flow meter detector electronics. The retrievable canister is sealed, waterproof and may be light-weight. In one embodiment, the retrievable canister may be retrieved and installed through an alignment guide which acts as a guide to aid in correct positioning by the novel use of a remotely operated vehicle ("ROV") without the use of a light intervention tool. A specially designed connector disposed on an exterior surface area of the removable canister provides one or more connections between the multiphase flow detector electronics disposed in the interior of the canister and the flow meter sensor housing mating connector.

The removable canister may be cooled by surrounding sea water, which may stabilize the temperature of the flow detector electronics and may improve equipment and component mean time before failure. In another embodiment, the removable canister is insulated and additionally cooled by the surrounding sea water which may stabilize the temperature of the flow detector electronics and may improve equipment and component mean time before failure.

The scope of protection is not limited by the summary of an exemplary embodiment set out above, but is only limited by the claims.

BRIEF DESCRIPTION OF THE DRAWINGS

A better understanding of the present invention can be obtained when the detailed description set forth below is reviewed in conjunction with the attached drawings depicting various embodiments of the present invention. The attached drawings are incorporated herein as if set out in full.

DETAILED DESCRIPTION OF EXEMPLARY EMBODIMENTS

Figure 1:
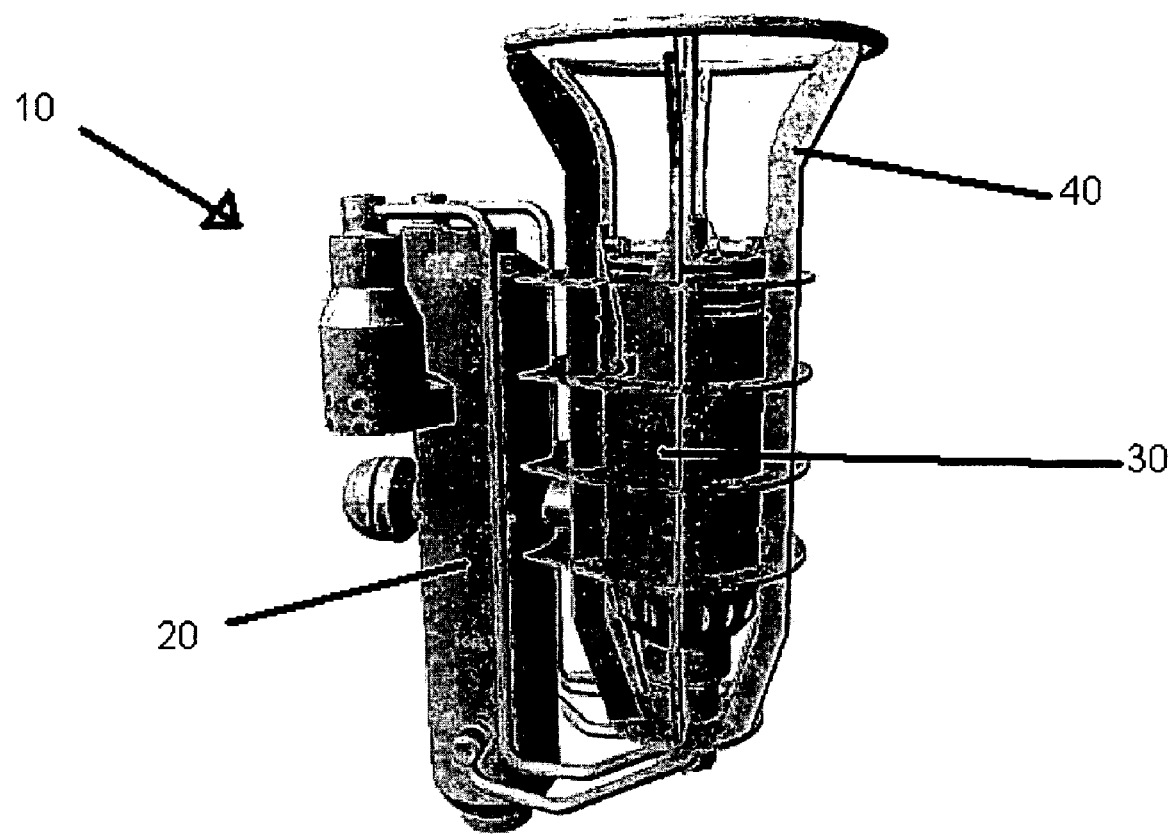
FIG. 1 is a perspective view of an embodiment of the present inventions.

Referring now to FIG. 1, retrievable canister 30 is removably secured to multiphase flow meter 10, which comprises flow tubular housing 20 and alignment guide 40. Fluid flowing within multiphase flow meter 10 can be single or multiphase and be oil, water or gas, or any combination thereof, as well as any similar type of fluid or combination.

Flow meter housing 10 may comprise flow tubular housing 20 and alignment guide 40.

Figure 2:
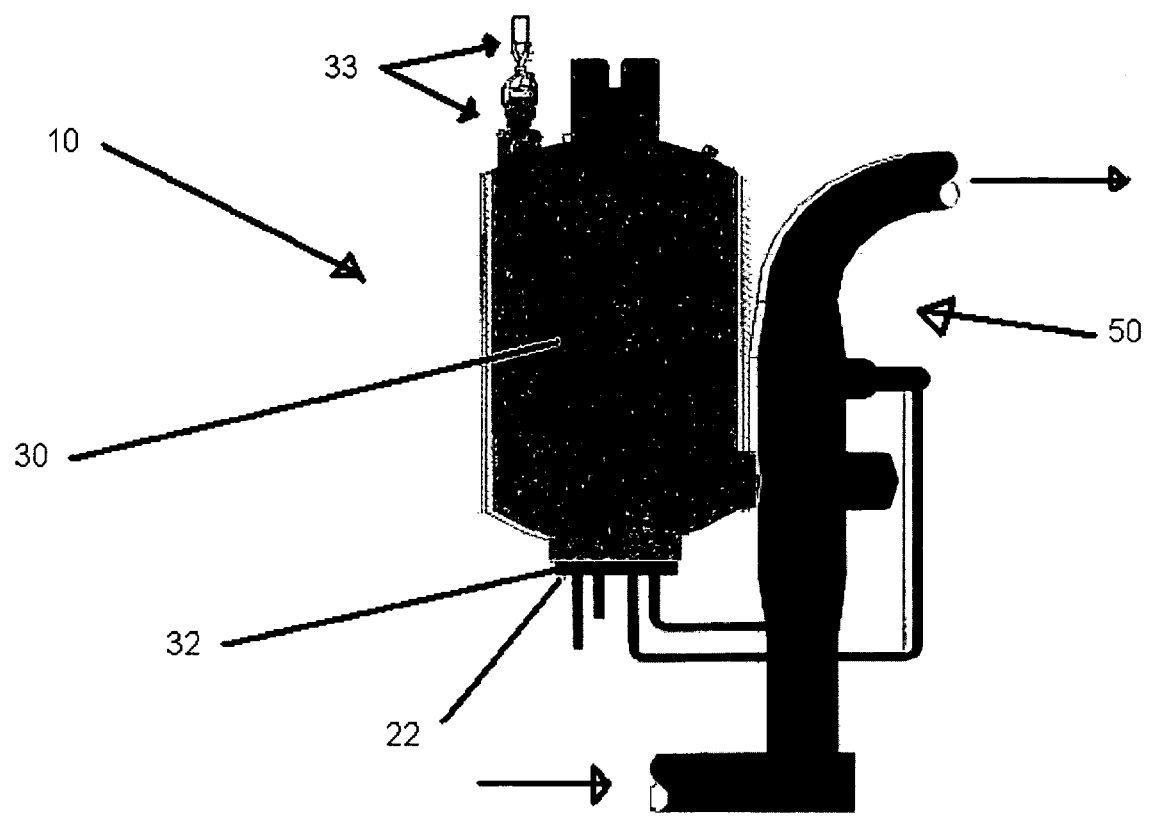
FIG. 2 is a cutaway view of an embodiment of the present inventions.

Referring to FIG. 2, either flow tubular housing 20 or alignment guide 40 comprises flow meter sensor housing mating connector 22. Flow meter sensor housing mating connector 22 provides for further communication with one or more devices (not shown in the figures) disposed on, near, or within flow tubular housing 20 of multiphase flow meter 10, e.g. for transmission of power and data or control signals.

Retrievable canister 30, which is preferably water-tight, comprises an exterior surface area and an interior volume. Electronics (not shown in the figures), e.g. fluid flow detector electronics, may be disposed within an interior volume of retrievable canister 30 in any of numerous conventional ways as will be familiar to those of ordinary skill in the subsea instrumentation arts. In an embodiment, retrievable canister 30 may comprise a substantially cylinder shape, e.g. having spherical or obround ends. Retrievable canister 30 comprises connector 32 adapted to provide a water-tight connection to flow meter sensor housing mating connector 22 and thus further between its interior electronics and one or more devices (not shown in the figures) disposed on, near, or within flow tubular housing 20 of multiphase flow meter 10, e.g. for transmission of power and data or control signals.

Figure 4:
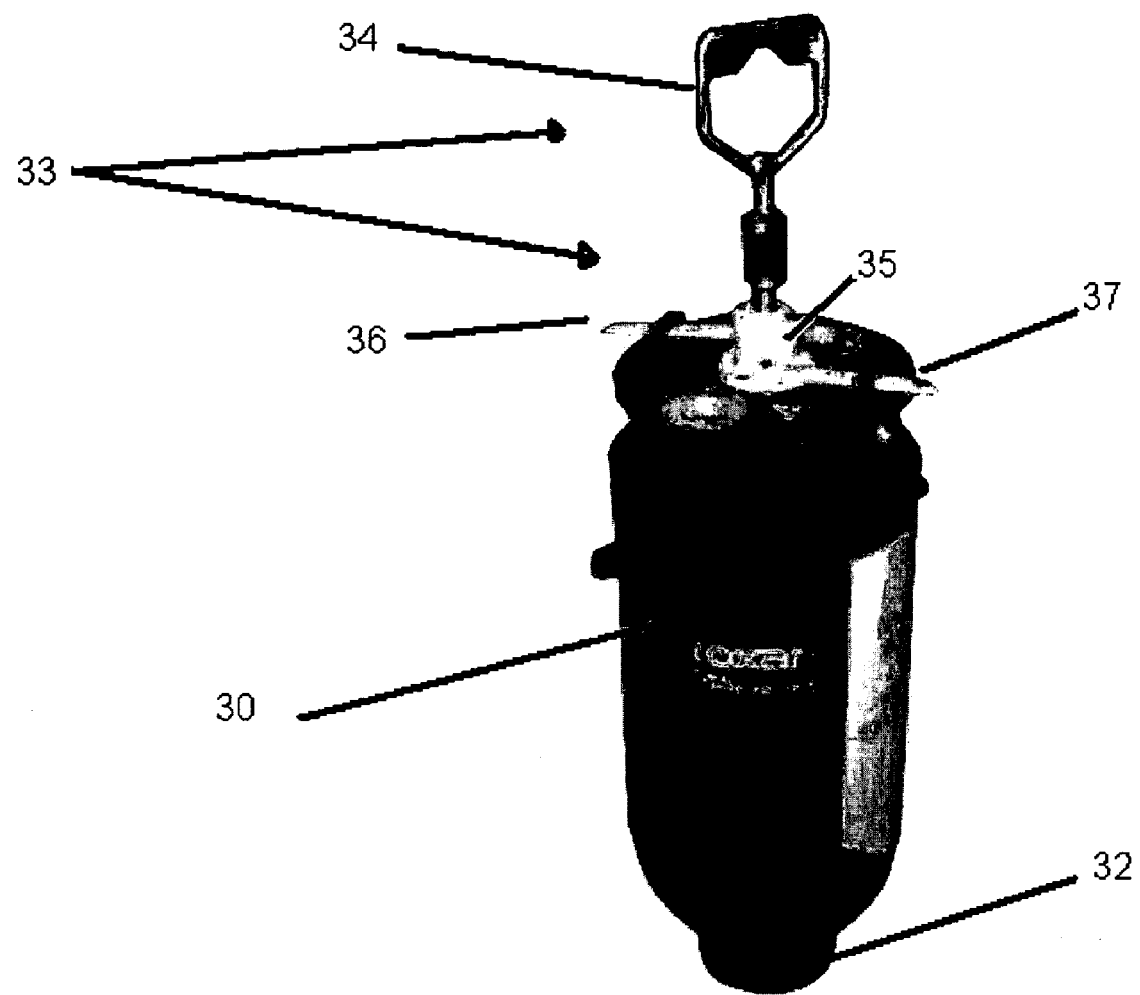
FIG. 4 is a perspective view of an embodiment of a retrievable canister of the present inventions.

Canister 30 uses a locking mechanism 33, shown in an exemplary embodiment in FIG. 4 as handle 34, hub 35, and locking pins 36 and 27, to be secured to multiphase flow meter 10. Locking mechanism 33 is disposed on the exterior surface area of retrievable canister 30 and may be selectively engaged or disengaged to selectively secure retrievable canister 30 to multiphase flow meter 10 to mate connector 32 with flow meter sensor housing mating connector 22. Locking mechanism 33 may be disposed on an end of retrievable canister 30 opposite connector 32.

In the exemplary embodiment illustrated in FIG. 4, locking mechanism 33 operates by pivotally mounting locking pins 36 and 37 to hub 35 which is rotatably mounted about a center axis and adapted to move axially in either direction upon rotary motion of handle 34. Movement in a direction, e.g. circumferentially, forces pins 36 and 37 to extend from hub 35 and movement in the opposite direction forces pins 36 and 37 to retract. Pins 36 and 37 may align with corresponding mating receivers, e.g. receivers (not shown in the figures) in Flow meter housing 10. Once hub 35 is rotated to a desired position, hub 35 may be locked into that position by any of numerous, equivalent methods as will be known to those of ordinary skill in these arts. One or more additional latches or locking mechanisms may be present, e.g. as mating portions of connector 32 and flow meter sensor housing mating connector 22.

Referring additionally back to FIG. 1, alignment guide 40 maybe attached to flow tubular housing 20 or be integral with flow tubular housing 20, i.e. multiphase flow meter 10 may be a unitary device comprising both flow tubular housing 20 and alignment guide 40. Alignment guide 40 will typically comprise a volume greater than the volume of canister 30 and may further generally conform to the three-dimensional shape of canister 30.

Alignment guide 40 may act as an aid to positioning retrievable canister 30 and its locking mechanism 33 when inserting retrievable canister 30 into, and attaching, or disconnecting and retrieving retrievable canister 30 from flow meter sensor housing 10, including engaging connector 32 with or disengaging connector 32 from flow meter sensor housing mating connector 22.

Figure 3:
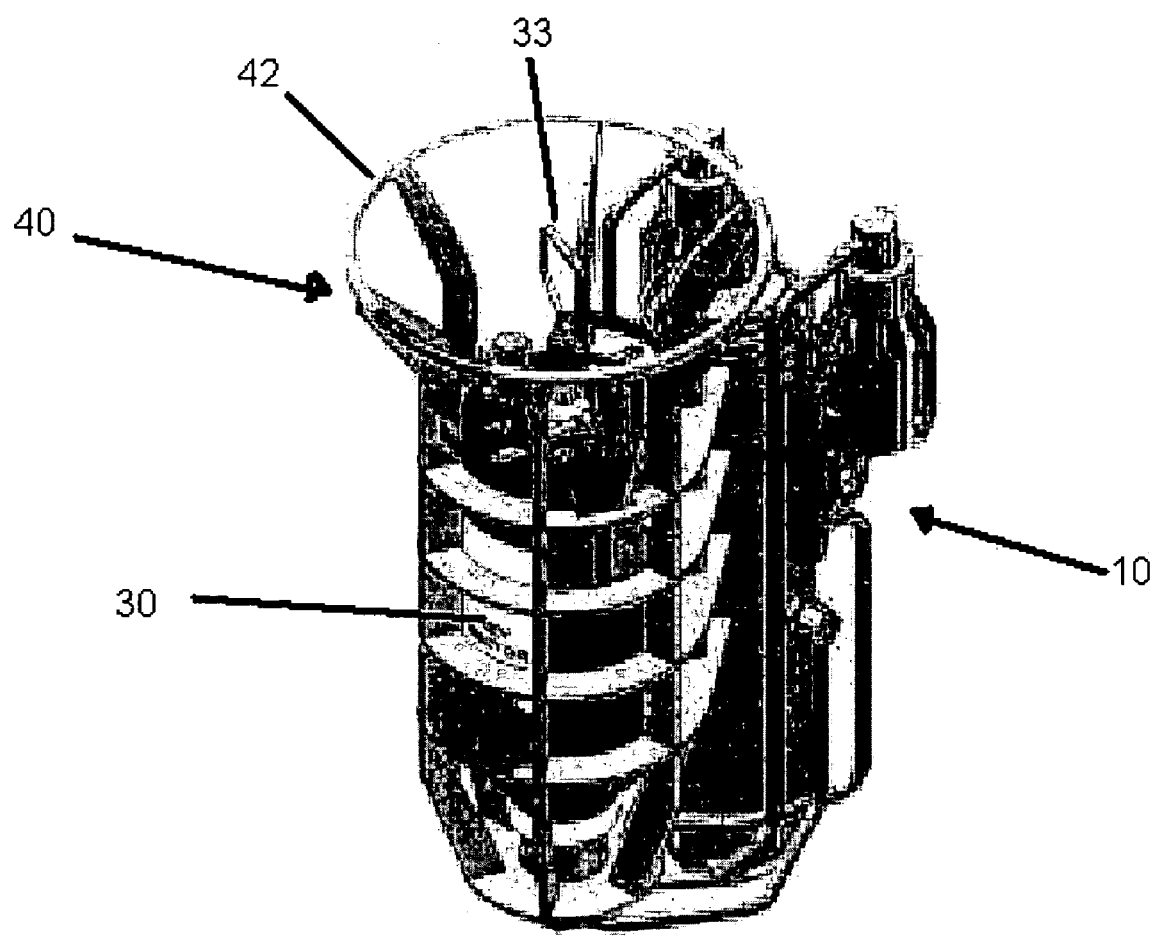
FIG. 3 is a perspective view of an embodiment of the present inventions.

Referring additionally to FIG. 3, for proper alignment and orientation of retrievable canister 30 during a subsea mating operation, alignment guide 40 comprises guide funnel 42 or other a substantially conical opening to receive retrievable canister 30.

Retrievable canister 30 may be locked to either stationary portion 30 or alignment guide 40, e.g. to guide funnel 42. Retrievable canister 30, when locked into position, e.g. using locking mechanism 33, forms a water-tight seal between connector 32 and flow meter sensor housing mating connector 22. A mechanical locking mechanism (not shown in the figures) that maintains retrievable canister 30 in position after mating may be present at a second end of retrievable canister 30.

In an embodiment, retrievable canister 30 comprises an exterior shell comprising a metal suitable for use subsea to protect its inner electronics from intrusion of sea water. In a preferred embodiment, the exterior shell protects the inner electronics from intrusion of sea water at depths up to at least 3000 meters. Internally, retrievable canister 30 may have an environment comprising a predetermined pressure maintained with an inert gas such as Nitrogen, e.g. around one atmosphere.

In an embodiment, retrievable canister 30 is insulated from its external environment which may improve equipment and component mean time before failure.

In the operation of exemplary embodiments, a method of mating a retrievable canister 30 to stationary section 20 of multiphase flow meter 10 is accomplished by using a remotely operated vehicle ("ROV") subsea (not shown in the figures). In this method, retrievable canister 30 is positioned by an ROV into alignment guide 40. A 90 degree turn may be required by the ROV to engage the locking mechanism.

The remote engagement or disengagement of the water-tight canister locking mechanism may be accomplished by using a light intervention tool or by using a ROV to position retrievable canister 30 into alignment guide 40. The ROV then guides retrievable canister 30 to a position wherein connector 32 is proximate mating connector 22. Once positioned, locking mechanism 33 is engaged by the ROV to secure retrievable canister 30 to stationary portion 20 of flow tubular housing 10.

To retrieve retrievable canister 30, locking mechanism 33 is disengaged by the ROV to unsecure retrievable canister 30 from stationary portion 20 of flow tubular housing 10 and retrievable canister 30 retrieved from stationary portion 20 of flow tubular housing 10 by the ROV.

Typically, engaging locking mechanism 33 further engages connector 32 to mating connector 22 to establish communications between electronics disposed within retrievable canister 30 and one or more predetermined devices external to retrievable canister 30 this manner, a device disposed outside retrievable canister 30, e.g. a fluid flow detector (not shown in the figures) disposed within or proximate flow tubular 10, is operatively connected to electronics disposed within retrievable canister 30, e.g. a flow meter. This allows communication between these devices and receives data transmitted by sensors from the flow meter sensor housing mating connector after the locking mechanism is engaged. The data transmission, and, hence, the connection, may be electronic, fiber optic, acoustic, or the like, or a combination thereof. The fluid flow detector is self-contained and may utilize a self-contained power unit, a central processing unit to calculate the fluid flow from the transmission of data received from the flow meter sensor housing mating connector, or the like, or a combination thereof. The central processing unit may use a computer software flow algorithm to calculate the fluid flow. The fluid flow detector may also allow for the local or remote transmission or recording of the calculated fluid flow.

The foregoing disclosure and description of the invention are illustrative and exemplary thereof, and various changes in the size, shape and materials, as well as in the details of the illustrated construction, may be made without departing from the spirit of the invention.

What is claimed is:

1. A subsea multiphase flow meter sensor housing, comprising:
   a. a flow tubular housing;
   b. a retrievable canister, adapted to be removably attached to the flow tubular housing and to house electronics; and
   c. an alignment guide connected to the flow tubular housing, said alignment guide adapted to receive said canister.

2. The subsea multiphase flow meter sensor housing of claim 1, wherein the electronics comprise a multiphase flow meter detector.

3. The subsea multiphase flow meter sensor housing of claim 2, wherein:
   a. the multiphase flow detector is self-contained and further comprises at least one of (i) a self-contained power unit or (ii) a central processing unit adapted to calculate fluid flow from transmission of data received through a flow meter sensor housing mating connector; and
   b. the multiphase flow detector is further adapted to allow for local or remote transmission or recording of fluid flow in the flow tubular housing.

4. The subsea multiphase flow meter sensor housing of claim 1, wherein:

a. the retrievable canister further comprises a connector disposed on an exterior surface area of the retrievable canister, the connector in communication with the electronics; and
b. the flow tubular housing further comprises a flow tubular housing connector adapted to provide a water-tight mating with the retrievable canister connector and provide for communication between the electronics and a device.

5. The subsea multiphase flow meter sensor housing of claim 4, wherein the flow tubular housing connector and the retrievable canister connector are adapted to accommodate at least one of (i) an electrical interface, (ii) a fiber optic interface, or (iii) an acoustic interface.

6. The subsea multiphase flow meter sensor housing of claim 1, wherein retrievable canister is at least one of (i) sealed, (ii) waterproof, or (iii) light-weight.

7. The subsea multiphase flow meter sensor housing of claim 1, wherein:
a. the retrievable canister further comprises a selectively engageable lock adapted to secure the retrievable canister to the flow tubular housing.

8. The subsea multiphase flow meter sensor housing of claim 1, wherein the retrievable canister is adapted to be cooled by at least one of (i) surrounding sea water, (ii) insulation, or (iii) both insulation and surrounding sea water.

9. The subsea multiphase flow meter sensor housing of claim 1, wherein the retrievable canister further comprises an environment of a predetermined pressure maintained with an inert gas.

10. The subsea multiphase flow meter sensor housing of claim 9, wherein the predetermined pressure maintained with an inert gas is around one atmosphere.

11. A method of mating a retrievable canister to a stationary section of a multiphase flow meter, comprising:
a. using a remotely operated vehicle (ROV) to position a retrievable canister into an alignment guide located proximate a flow tubular housing;
b. guiding the retrievable canister to a position wherein a connector on the retrieve a canister is proximate a mating connector on a stationary portion of the flow tubular housing;
c. engaging a locking mechanism by the ROV to secure the retrievable canister to the stationary portion of a flow tubular housing.

12. The method of claim 11, further comprising:
a. disengaging the locking mechanism by the ROV to unsecure the retrievable canister from the stationary portion of a flow tubular housing; and
b. retrieving the retrievable canister from the stationary portion of a flow tubular housing using the ROV.

13. The method of claim 12, wherein engaging the locking mechanism further engages the connector on the retrievable canister to the mating connector on the stationary portion of the flow tubular housing to establish communications between electronics disposed within the retrievable canister and a predetermined device external to the retrievable canister.

14. The method of claim 13, wherein engaging further comprises turning the lock approximately 90 degrees to engage the locking mechanism.

15. A subsea multiphase flow meter sensor housing, comprising:
a flow tubular housing;
a retrievable canister adapted to be removably attached to the flow tubular housing and to house electronics, said canister including a selectively engageable lock adapted to secure the retrievable canister to the flow tubular housing; and
an alignment guide connected to the flow tubular housing, said alignment guide adapted to receive said canister,
wherein the selectively engageable lock is adapted to be operated by a remotely operated vehicle ("ROV") without the use of a light intervention tool.

16. A subsea multiphase flow meter sensor housing, comprising:
a flow tubular housing;
a retrievable canister adapted to be removably attached to the flow tubular housing and to house multiphase flow detector electronics, said retrievable canister including a first end, an opposing second end and a selectively engageable lock disposed proximate to said first end, said lock adapted to secure the retrievable canister to the flow tubular housing;
an alignment guide connected to the flow tubular housing, said alignment guide adapted to receive said canister; and
an interface connector in communication with the multiphase flow detector electronics is disposed proximate to said second end of the retrievable canister.

17. A subsea multiphase flow meter sensor housing, comprising:
a flow tubular housing;
a retrievable canister adapted to be removably attached to the flow tubular housing and to house electronics, said canister including a selectively engageable lock adapted to secure the retrievable canister to the flow tubular housing; and
an alignment guide connected to the flow tubular housing and adapted to receive said canister, said alignment guide having a volume that is larger than the volume of the water-tight canister and a shape that generally conforms to the three-dimensional shape of the water-tight canister.

18. A subsea multiphase flow meter sensor housing, comprising:
a flow tubular housing;
a retrievable canister adapted to be removably attached to the flow tubular housing and to house electronics, said canister including a selectively engageable lock adapted to secure the retrievable canister to the flow tubular housing; and
an alignment guide connected to the flow tubular housing, said alignment guide adapted to receive said canister and aid in positioning the retrievable canister and the selectively engageable lock.

19. A subsea multiphase flow meter sensor housing, comprising:
a flow tubular housing;
a retrievable canister adapted to be removably attached to the flow tubular housing and to house electronics, said canister including a selectively engageable lock adapted to secure the retrievable canister to the flow tubular housing; and
an alignment guide connected to the flow tubular housing, said alignment guide adapted to receive said canister, said alignment guide being substantially funnel shaped and adapted to allow locking of the retrievable canister to the alignment guide using the selectively engageable lock.

* * * * *